March 6, 1934. W. F. MOORE Re. 19,104

METHOD FOR DISTILLING OILS

Original Filed July 12, 1928 4 Sheets-Sheet 1

Inventor
Wm. F. Moore
By his Attorney
R. J. Deacon

March 6, 1934. W. F. MOORE Re. 19,104

METHOD FOR DISTILLING OILS

Original Filed July 12, 1928 4 Sheets-Sheet 2

Inventor
Wm. F. Moore
By his Attorney
R. J. Dearborn

March 6, 1934. W. F. MOORE Re. 19,104

METHOD FOR DISTILLING OILS

Original Filed July 12, 1928 4 Sheets-Sheet 3

Inventor
Wm. F. Moore
By his Attorney
R. J. Dearborn

March 6, 1934. W. F. MOORE Re. 19,104

METHOD FOR DISTILLING OILS

Original Filed July 12, 1928 4 Sheets-Sheet 4

Inventor
Wm. F. Moore
By his Attorney
R. J. Dearborn

Reissued Mar. 6, 1934

Re. 19,104

UNITED STATES PATENT OFFICE 19,104

METHOD FOR DISTILLING OILS

William F. Moore, Bayside, N .Y., assignor to The Texas Company, New York, N. Y., a corporation of Delaware Original No. 1,873,454, dated August 23, 1932, Serial No. 292,283, July 12, 1928. Application for reissue February 23, 1933, Serial No. 658,044

5 Claims. (Cl. 196—58)

This invention relates primarily to a system for the distillation of heavy oils, such as residues taken from the stills of a pressure cracking system or the heavy residual tars resulting from the fractional distillation of crude oils. Certain crude oils may themselves be employed as the charge for the system contemplated, particularly where they do not contain any very great percentage of the lighter fractions.

It is a particular object of the invention to provide a system wherein heavy oils of the character specified may be converted into a large percentage of volatile constituents and leave behind only a small percentage of solid coke or carbon primarily in a granular or pulverous form. This result is intended to be brought about preferably without any substantial degree of cracking, although a greater amount of cracking may take place if desired.

Heretofore, the coking of heavy oils, such as contemplated, has been carried out on more or less of a batch operation basis through the use of large drums or coking stills in which a relatively large body of oil is heated until only a very heavy tar or a coky residue remains. When this point has been reached, these coking stills have had to be shut down for the purpose of cleaning out the coke which has deposited on the bottom and side walls of the drum. An object of the present invention has been to provide a coking system which is adapted to be continuously operated and one in which the charge that is continuously fed into the system has all of its volatile constituents driven off, leaving as residue only a finely divided form of carbon, which may be readily removed from time to time, or even continuously, from the system. Toward this end it is contemplated effecting the volatilization of the oil while it is in suspension in the form of a finely divided spray or mist within a highly heated chamber.

With these and other incidental objects and advantages in view, the invention will now be described in detail by reference to the accompanying drawings which form a part hereof.

Of the drawings, Figure 1 is a diagrammatic representatiton of one form of apparatus embodying the features of the present invention.

Figures 1, 2:
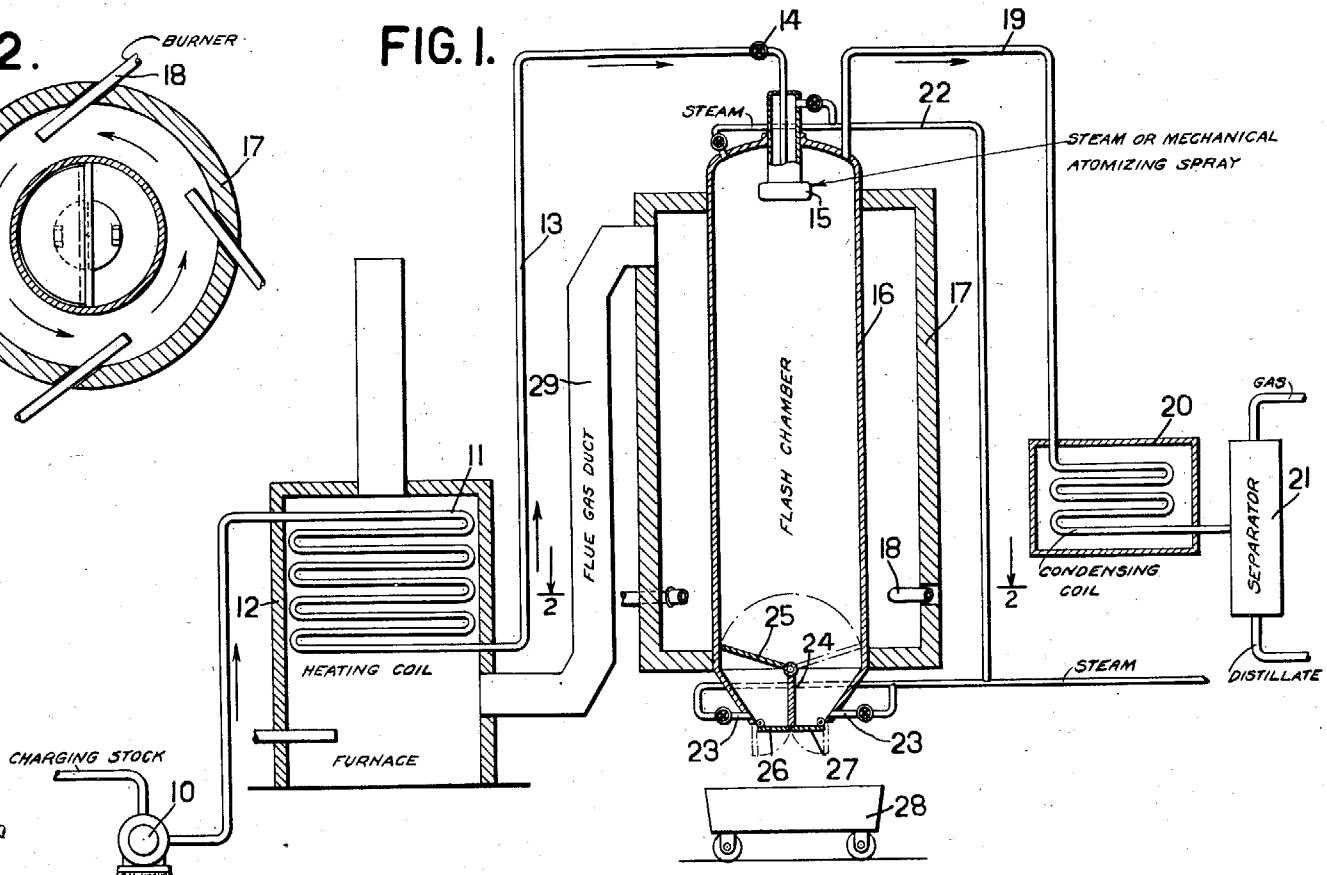
Figure 2 is a sectional view through the chamber and furnace along the line 2—2 of Figure 1.

Referring now to Figure 1, the charge of pressure still bottoms, or crude residuum, or similar material which it is desired to reduce to coke may be fed from any suitable storage by means of a pump 10 to a heating coil 11 suitably mounted within a furnace 12. It is contemplated that a substantial pressure will be maintained on the oil in circulating it through the coil 11 and this may, for example, range between 200 and 800 pounds, while the temperature of the oil at the outlet end of the coil may be between 700° and 900° F. The heated oil may be led under pressure through a transfer line 13 having a valve 14 to one or more spray nozzles 15 suitably mounted at the top of an enlarged chamber 16. In passing through the spray nozzle, the pressure will preferably be substantially completely relieved, or will at least be materially reduced. The chamber may suitably be about 40 feet in height and about 10 feet in diameter. Since the pressure within it, under the preferred operation, will be substantially atmospheric, desirably less than one pound above atmospheric, it is not necessary to provide very thick walls for the chamber. It is mounted within a furnace 17 where a large area of its wall, particularly at the mid-portion, is subjected to a relatively high temperature; for example, the wall may be heated to such an extent that its inner surface will radiate heat within the chamber and maintain a temperature of between 800° and 1200° F. therein. If only a single chamber is employed, the furnace may well assume a circular form, as best shown in Figure 2. Heat may advantageously be applied by means of a series of burners 18 which may be arranged tangentially in the manner shown so as to provide for a circulatory movement of the heated flue gases.

Now, it will be clear that as the previously heated oil is discharged into the chamber through the nozzles 15, bringing about a very substantial reduction in pressure, a large percentage of the oil will be immediately volatilized. Furthermore, as the remaining heavier portions descend in their finely divided spray form, they will be subjected to the additional heat supplied by the chamber, but they will preferably be so directed as not to come into direct contact with the walls of the chamber. Being at very little more than atmospheric pressure, all of the volatile portions of the charge will be completely vaporized before the drops composing the spray reach the bottom of the chamber. This will leave merely a finely divided form of carbon to be collected at the base of the chamber. All of the vapors which are released or generated in the manner indicated will be carried out at the top of the chamber through a vapor line 19 to a condenser 20 and collection receptacle or separator 21. If desired, the vapors might be subjected to immediate fractionation without being passed through the condenser 20.

As an aid to the volatilization of the liquid portions of the incoming charge, steam may be injected into the system through a line 22 merging with the charge line for the oil at, or in advance of, the spray nozzles. Preferably, it will be introduced directly into the nozzle in such a way as to aid in the atomizing action of the latter, although it may be introduced independently into the top of the chamber, if desired.

In order to enable the removal of the carbon which collects in finely divided form at the base of the chamber, a double hopper construction is provided. This may consist of a partition wall 24 having pivoted at its upper end a trap-door 25. This may be inclined upwardly from the center of the chamber and may be adapted to alternately close off two sections or compartments at the lower end of the chamber. A pair of trap-doors 26 and 27 may control the discharge of the carbon particles from these compartments. It will be apparent that by swinging the door 25 to one side or the other, either compartment may be made to receive the carbon, as desired. The double hopper construction is provided for the purpose of preventing the entry of air into the chamber at a time when the carbon is being discharged. Thus, any that may be deposited in the compartment above the trap-door 26, may be dropped into a suitable container 28, or any form of conveyor, while more carbon is being collected in the compartment above the door 27 and vice versa. Preferably, the lower end of the chamber where the coky particles collect will be outside of the furnace so that it will be somewhat cooler than the upper portion. This will eliminate any tendency for the carbon particles to form a more solid mat. Similarly, the provision of steam connections 23 for the direct introduction of steam at this point will aid in the prevention of solid coke formation. At the same time the steam in absorbing heat from the carbon particles will become superheated to a greater extent and will rise into the chamber to further aid the action therein.

It may be found desirable to provide the chamber 16 with a suitable form of scraper mechanism for the purpose of removing any carbon which may be deposited on the walls. However, by properly directing the spray from the nozzles 15 away from the walls of the chamber, the necessity for the employment of scrapers may be largely eliminated.

While the double hopper construction at the base of the chamber will serve to prevent access of air to the interior during the removal of carbon, the maintenance of a slight pressure within the chamber 16 will provide a further safeguard against the introduction of air, which might result in an explosion.

Any suitable means may be provided for supplying heat to the furnace 12; for example, a duct 29 from the furnace 17 may serve to conduct the heated flue gases from the latter so that by convection they may transmit their heat to the coil 11. A separate source of heat may be provided for the coil 11, if desired.

Figure 4:
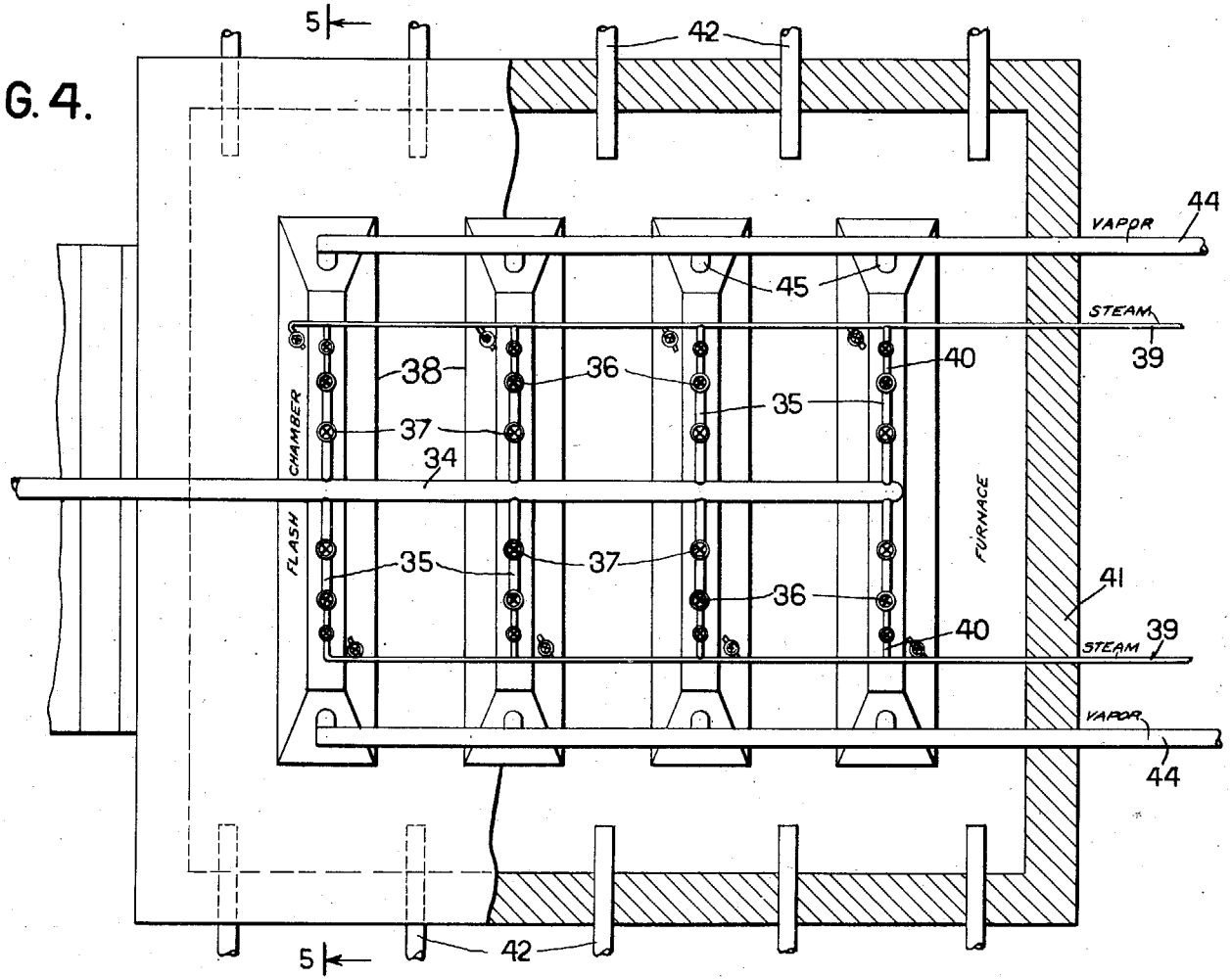
Figure 4 is a diagrammatic showing in plan view of a form of chambers and furnace that may be employed in the system of Figure 3.
Figure 5:
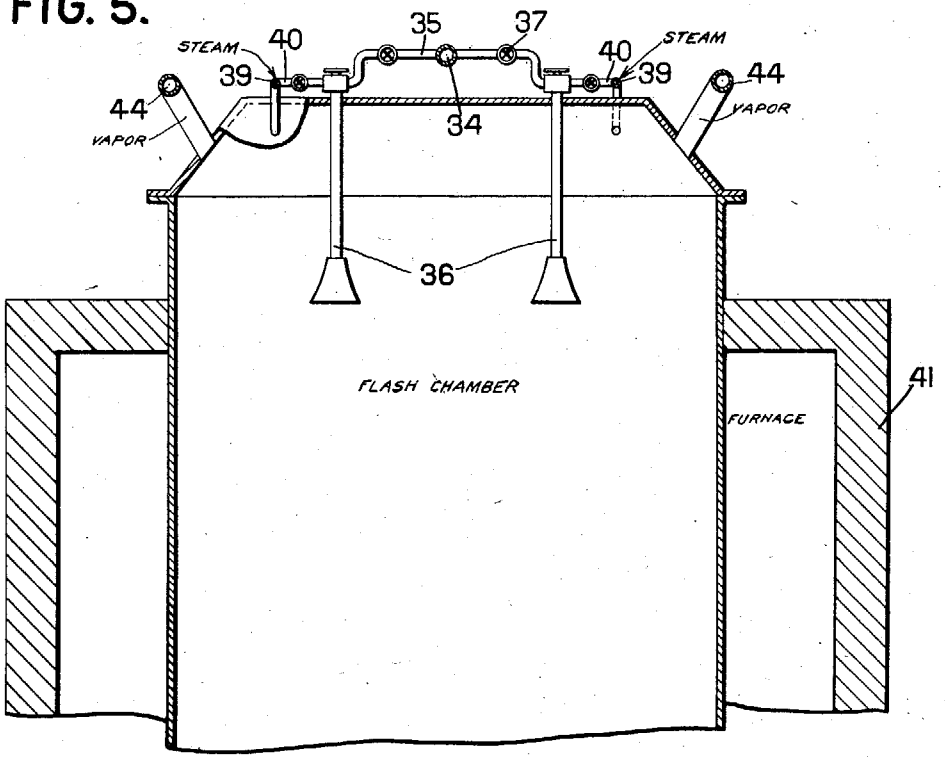
Figure 5 illustrates, in side elevation, one of the chambers that may be employed in the system of Figure 3.

In the modified form of the invention, shown in the remaining figures, the chief distinction resides in the provision of a plurality of chambers corresponding to the chamber 16 of Figure 1. This is for the purpose of increasing the capacity of the system and for adapting it more readily to the employment of a larger number of jets, or spray nozzles. Thus, the charge of oil may be forced by a pump 30 through a number of heat exchange units 300 and 301 and thence by a line 31 to a heating coil 32 in a furnace 33. The charge in passing through the coil may be maintained under a substantial pressure and may be then passed by a transfer line 34 to a plurality of branch lines 35, (Figures 4 and 5), each provided with a spray nozzle 36. In order that any one or more of the branch lines 35 may be taken out of operation at will, suitable valves 37 may be provided therein. The nozzles 36 are mounted in the upper ends of a plurality of chambers 38 which are preferably rectangular in cross section, or, if desired, may be somewhat elliptical in cross section, or may be provided with semi-circular end-walls. Each chamber may, for example, be four feet by twelve feet in cross section and, say, forty feet in height. If only a single nozzle is desired in each of the chambers, then the circular form indicated in Figures 1 and 2 may be adopted.

The nozzles will serve to release the pressure to substantially atmospheric and should be of a type adapted to form a relatively flat but wide spray, such as provided by a flat-flame burner. This will enable the employment of a plurality of jets in the manner indicated in Figures 4 and 5 within each of the chambers. Steam will preferably be injected into the system through the nozzles in such a way as to aid in the atomization of the oil. For this purpose steam-lines 39 may be provided with valve-controlled branch lines 40 to each of the nozzles.

Figure 3:
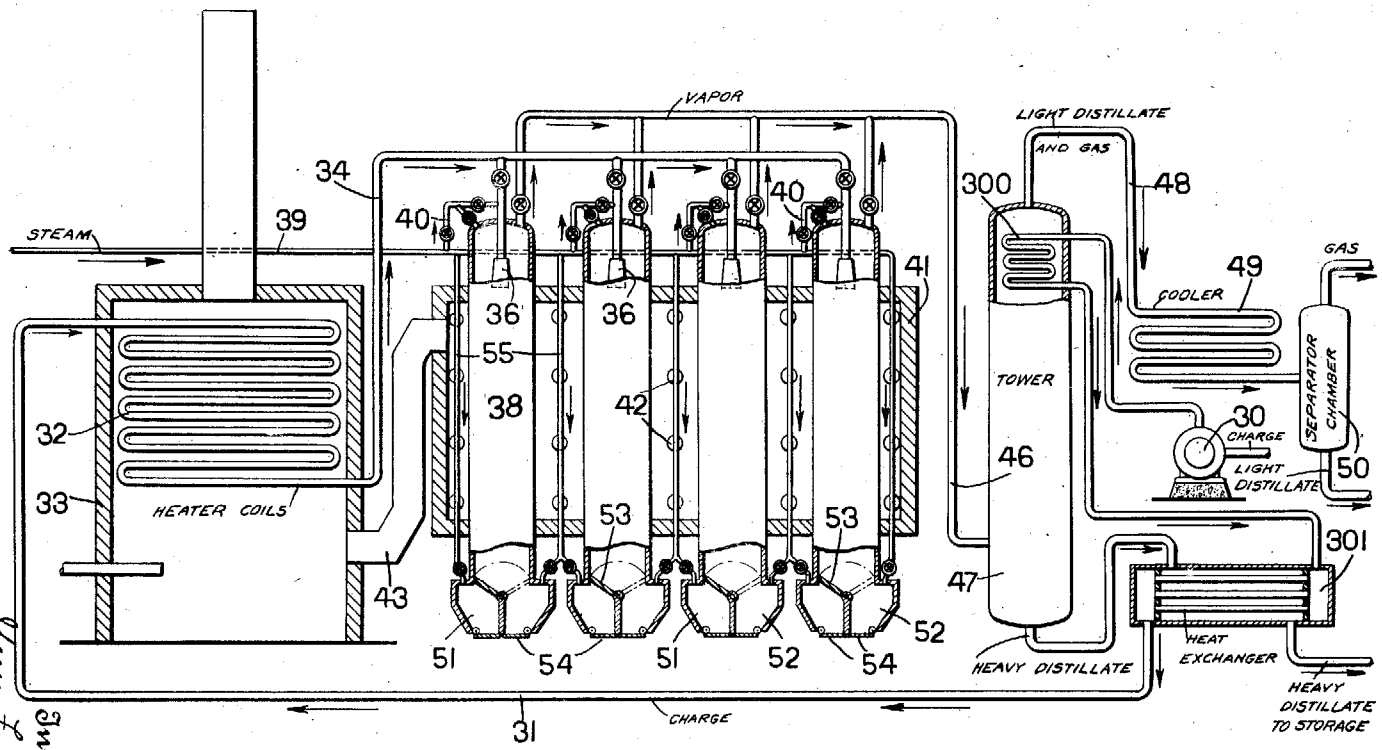
Figure 3 is a diagrammatic showing in elevation of a modified form of apparatus adapted to operate in accordance with the invention.

A suitable furnace 41 heated from any source such as a series of burners 42 appropriately located along both sides of the furnace may surround the mid-portions of all of the chambers. Just as in the form disclosed in Figure 1, the heated gases may, upon leaving the furnace 41, be passed by a duct 43 to the furnace 33 surrounding the coil 32 to supplement the separate heating source in the form of burners which may be provided for this coil. A pair of vapor lines 44, having branch connections 45 with the tops of the several chambers at their opposite ends, may serve to convey the volatilized portions of the charge to a line 46, which will convey them to a separating tower 47. Here the lighter constituents may pass out in the form of vapors overhead through a line 48 to a condenser 49 and storage receptacle 50. The heavier constituents of the vapors entering the tower 47 may be condensed therein and may be drawn off from the base and passed through the heat exchanger 301, already mentioned, and thence to storage. Obviously, if desired, the tower may be eliminated and all of the vapors may be condensed together and sent to a single storage receptacle. For the purpose of periodically removing the finely divided particles of carbon that collect in each of the chambers, a double hopper construction similar to that shown in Figure 1 may be provided. Thus, referring to Figure 3, each chamber may be provided at its lower end with a pair of carbon-receiving hoppers or pockets 51 and 52, one or the other of which is always in conmmunication with the chamber while the other is closed off by means of a swinging door 53 pivoted at the upper end of the division wall between the hoppers. As any of the hoppers fill up the door 53 may be swung to the opposite side to close off that hopper from the chamber and a trap-door 54 at the base of the hopper may be opened to dump the carbon into a car or other receptacle. If desired, a single, large hopper might be provided to extend beneath all of the chambers, in which case only a single pocket would have to be provided at the lower end of each chamber and this adapted to discharge periodically into the common hopper. Steam may be injected into the pockets 51 and 52 through lines 55 connected to the main lines 39 to prevent the formation of large mats of coke, which would be difficult to remove.

While several admirable forms of the invention have been disclosed in the foregoing sections, and certain specific dimensions and operating conditions have been mentioned, it is to be understood that this disclosure is merely for the purpose of illustration and that numerous modifications may be made without departing from the spirit of the invention. It is not desired to be limited in its scope other than by the terms of the claims which follow.

What I claim is:

1. The process of converting heavy hydrocarbon oil into distillate and coke which comprises, heating the oil under relatively high superatmospheric pressure, expanding the heated oil in the form of a spray into the top of a vertically disposed elongated chamber maintained under relatively low pressure and free from products of combustion, permitting the liquid component droplets of the sprayed oil to descend in the chamber while introducing steam into the bottom of the chamber at a point remote from the point of introduction of the expanded oil so as to create a current of steam passing upwardly without high agitation counter current to the downwardly moving droplets, maintaining a temperature in the chamber sufficient to evaporate the volatile constituents of said droplets during their downward movement, permitting the resultant coke particles produced from said droplets to continue their downward movement, and collecting said coke particles in the bottom of said chamber for removal.

2. The process of converting heavy hydrocarbon oil into distillate and coke that comprises heating the oil in a stream under superatmospheric pressure, expanding the heated oil in a spray into the top of a vertically disposed elongated chamber maintained under substantially atmospheric pressure and free from products of combustion and wherein no liquid level is maintained, permitting the droplets or liquid components of the sprayed oil to descend in the chamber while the evolved vapors pass upwardly and out of the chamber, maintaining a sufficient temperature in the chamber that the droplets of descending liquid are evaporated or flashed to coke in descending through the chamber, collecting the resultant coke particles at the bottom of the chamber, and injecting steam into the bottom of the chamber through the mass of coke so collected to prevent the formation of large mats of coke which would be difficult to remove.

3. The method of converting a heavy petroleum oil to coke and lower-boiling distillate oil which, when carried out in apparatus comprising a pipe coil and an externally heated vertically disposed elongated coking chamber for the purpose of producing coke of such character as may readily be discharged from said chamber, comprises heating said oil under superatmospheric pressure while in transit through said pipe coil, discharging the heated oil in finely atomized form into the interior of said chamber in such manner as to maintain said oil substantially out of contact with the vertical walls thereof while falling through the free space within said chamber, applying heat externally to the walls of said chamber to heat said walls to a temperature substantially above that obtaining in said pipe coil to devolatilize and effect substantial solidification of said oil while falling through the free space within said externally heated chamber, while excluding gases of combustion from the interior of said chamber, removing liberated vapors from said chamber, and condensing them to recover a distillate oil therefrom.

4. The method of converting a heavy petroleum oil to coke and lower-boiling distillate oil which, when carried out in apparatus comprising a vertically disposed elongated chamber for the purpose of producing coke of such character as may readily be discharged from said chamber, comprises spraying said oil into the interior of said chamber in such manner as to maintain said oil substantially out of contact with the vertical walls thereof while falling through the free space within said chamber, supplying heat by combustion of fuel externally to the walls of said chamber to maintain the walls at a temperature substantially above that of the entering heavy oil while excluding gases of such combustion from the interior of said chamber, and regulating the rate of introduction of the oil and the degree of heating of the walls of said chamber to devolatilize said oil and reduce the residual portions thereof to a substantially solidified condition while falling through the free space within said chamber, removing liberated vapors from said chamber and condensing them to recover a distillate oil therefrom.

5. The method of converting a heavy petroleum oil to coke and lower-boiling distillate oil which, when carried out in apparatus comprising a vertically disposed elongated chamber for the purpose of producing coke of such character as may readily be discharged from said chamber, comprises spraying said oil into the interior of said chamber in such manner as to maintain said oil substantially out of contact with the vertical walls thereof while falling through the free space within said chamber, supplying heat by combustion of fuel externally to the walls of said chamber to heat said walls to a temperature of 100° F. or more above that of the entering oil while excluding gases of such combustion from the interior of said chamber, regulating the rate of introduction of the oil and the degree of heating of the walls of said chamber to devolatilize said oil and reduce residual portions thereof to a substantially solidified condition while falling through the free space within said chamber, periodically removing accumulated coke from said chamber without discontinuing the supply of heat to the walls thereof, removing liberated vapors from said chamber and condensing them to recover a distillate oil therefrom.

WILLIAM F. MOORE.